(12) United States Patent
Dierenbach et al.

(10) Patent No.: US 6,223,586 B1
(45) Date of Patent: May 1, 2001

(54) MICRO-ELECTROMECHANICAL DEVICE INSPECTION

(75) Inventors: Karl Allen Dierenbach, Monument; Fred John Trusell; John Carlson Ames, both of Colorado Springs; Paul Elwin Stevenson, Colorado Springs, all of CO (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/220,021

(22) Filed: Dec. 23, 1998

(51) Int. Cl.$^7$ ....................................................... G01M 3/04
(52) U.S. Cl. ................................ 73/45.5; 73/40.7; 73/49.3
(58) Field of Search .............................. 73/40, 41.2, 45.4, 73/45.5, 49.3, 52, 49, 40.7, 45.6

(56) References Cited

U.S. PATENT DOCUMENTS

| | | |
|---|---|---|
| 2,846,872 | 8/1958 | McAdama et al. . |
| 3,479,862 | 11/1969 | Trapp et al. . |
| 3,559,462 | 2/1971 | Beuchat . |
| 3,592,047 | 7/1971 | Carleton . |
| 3,731,295 | 5/1973 | VanLuyn . |
| 4,048,845 | 9/1977 | Gilbert . |
| 4,282,744 | 8/1981 | Dick . |
| 4,534,208 | 8/1985 | Macin et al. . |
| 4,711,118 | 12/1987 | Bossard et al. . |
| 4,736,621 | 4/1988 | Slinn et al. . |
| 5,228,330 | 7/1993 | Linn et al. . |
| 5,264,075 | 11/1993 | Zanini-Fisher et al. . |
| 5,323,642 | 6/1994 | Condon et al. . |
| 5,337,597 | 8/1994 | Peake et al. . |
| 5,369,983 | * 12/1994 | Grenfell ................................. 73/40.7 |
| 5,404,749 | 4/1995 | Spangler . |
| 5,578,331 | 11/1996 | Martin et al. . |

OTHER PUBLICATIONS

IBM Technical Disclosure Bulletin, Nov. 1, 1973, vol. 16, No. 6, pp. 1717–1720.*

Surface Cleaning and Carbonaceous Film Removal Using High Pressure, High Temperature Water, and Water/CO2 Mixtures, The Electrochemical Society Inc., p. 284–291.

Hermeticity Testing of Glass–Silicon Packages with On–Chip Feedthroughs, Center for Integrated Sensors and Circuits, University of Michigan.

* cited by examiner

Primary Examiner—Hezron Williams
Assistant Examiner—Michael Cyga
(74) Attorney, Agent, or Firm—Brinks Hofer Gilson & Lione

(57) ABSTRACT

An inspection method for evaluating the hermeticity of integrated circuits and micro-electromechanical devices having a cavity. The method includes submerging one or more of the devices in a liquid, under pressure, for a given time period in order to allow the liquid to seep into any cavities that have leak paths. After the pressure soak, the devices are transferred to another liquid and observed under a microscope for signs of the liquid in any of the devices cavities, thereby determining if hermeticity is present.

26 Claims, 3 Drawing Sheets

MICRO-ELECTROMECHANICAL DEVICE INSPECTION

FIELD OF THE INVENTION

The present invention relates to inspection methods for integrated circuit (IC) and micro-electromechanical (MEM) devices and more particularly to inspection of these devices for hermeticity.

BACKGROUND OF THE INVENTION

For certain IC and MEM devices, the environment in which they will be operating requires that they are hermetically sealed in order to operate properly. As used herein, when referring to the term "devices", it is meant to refer to MEM devices or IC devices that contain enclosed cavities. For these devices, then, some type of test or inspection is needed to assure that the ones which are not sealed properly are rejected. A common practice in the integrated circuit industry is to test for hermeticity using helium leak detectors, but this does not work for every type of package and substrate. While this method generally works well for ceramic packages, it does not work well with glass substrates since the glass will readily absorb the helium. The result is that the helium leak detector will detect a leak when in fact there may not be one. Consequently, the need arises for a reliable and inexpensive method to test for hermeticity of the devices, particularly for those applications that employ glass substrates.

SUMMARY OF THE INVENTION

In its embodiments, the present invention contemplates a method for inspecting for hermeticity of a device containing a cavity. The method comprises the steps of: submerging the device in a liquid; pressurizing the liquid to greater that one atmosphere for a given time period; removing the pressure from the liquid; and inspecting the device under magnification for indications of the liquid in the cavity.

Accordingly, an object of the present invention is to soak devices in high pressure liquid to force the liquid into the cavities of defective devices and then inspect the devices for hermeticity.

Another object of the present invention is to inspect the devices while in a liquid in order to avoid evaporation of the liquid that may be within the cavities.

An advantage of the present invention is that hermeticity can be assured, thus preventing defective devices from being assembled into finished electronic components.

A further advantage of the present invention is that hermeticity testing can be conducted for those devices employing glass substrates.

Another advantage of the present invention is that multiple devices can be subjected to the inspection process at one time, thus assuring an efficient and cost effective inspection process.

An additional advantage of the present invention is that the inspection for leakage can take place with the devices underwater to assure that the liquid which leaks into any of the cavities will not evaporate prior to inspection.

DETAILED DESCRIPTION OF THE PREFERRED EMBODIMENTS

Figure 1:
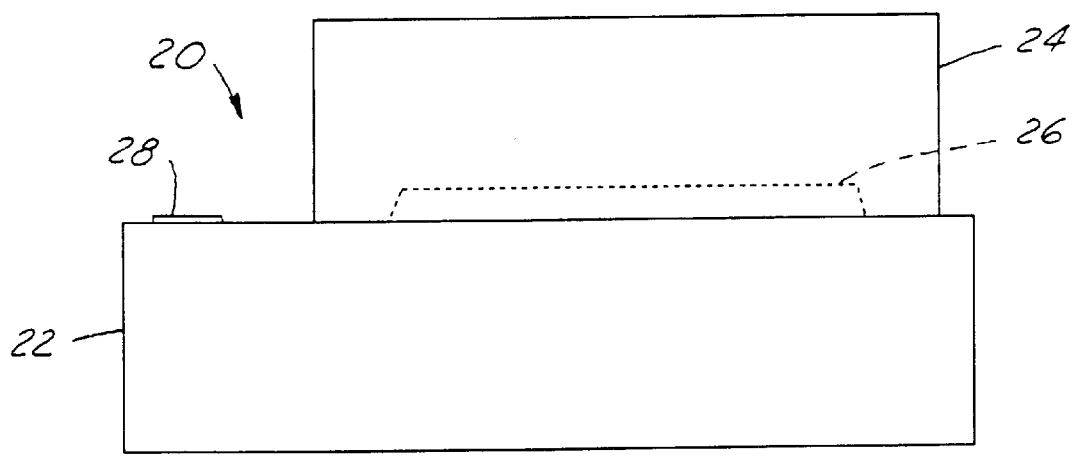
FIG. 1 is a schematic side view of an example MEM device that can be subjected to the hermeticity inspection in accordance with the present invention.
Figure 2:
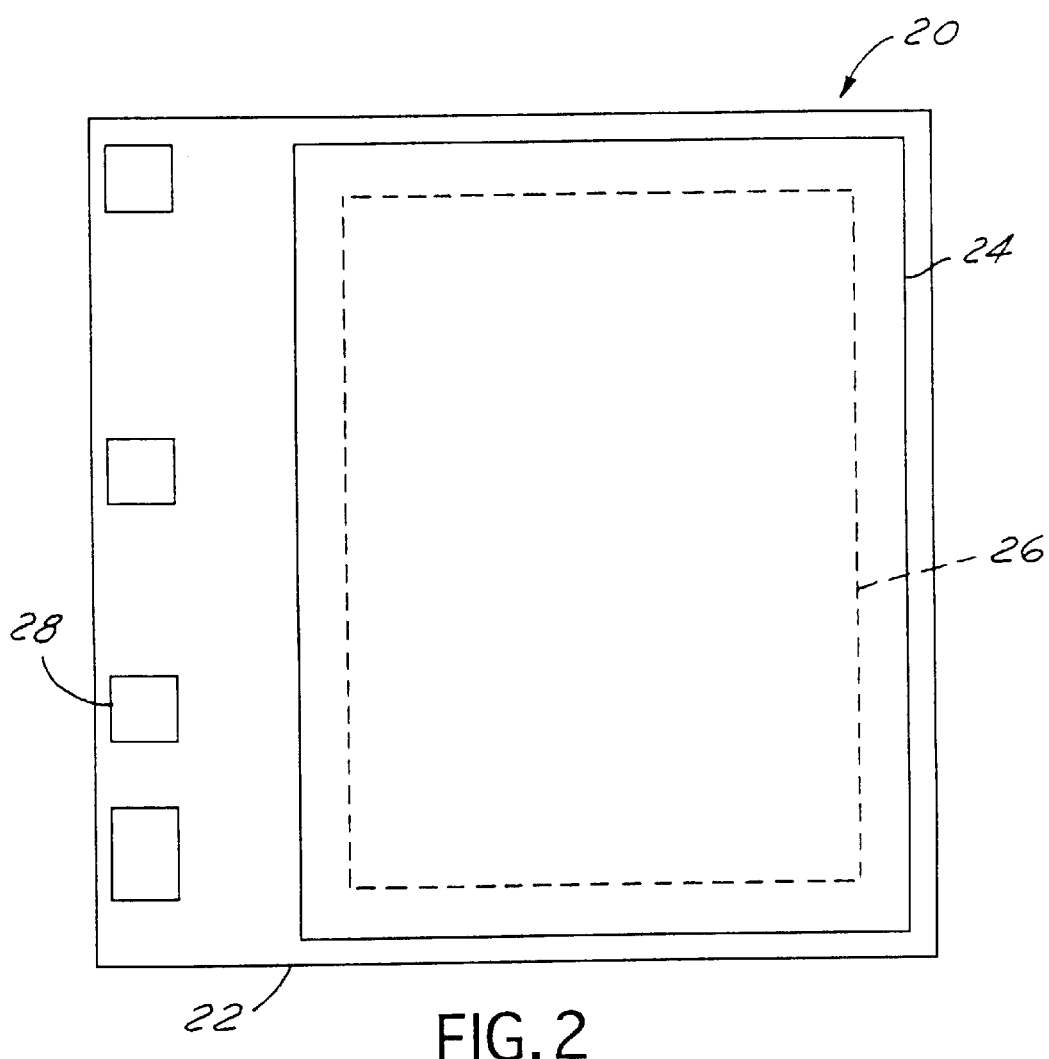
FIG. 2 is a schematic plan view of the MEM device of FIG. 1.

FIGS. 1 and 2 illustrate a typical MEM device 20. This device 20 includes a glass substrate 22, with a silicon lid 24 mounted thereon having a cavity 26 between the glass substrate 22 and the lid 24. While this is illustrated having a glass substrate, the substrate can also be formed from a ceramic; the device can also be some other type of integrated circuit (IC) containing a cavity, not necessarily a MEM device. A sensor or other type of element, not shown, will then reside in the cavity 26. Conventional bond pads 28 are also mounted to the substrate 22.

The MEM device that one may wish to inspect can be, for example, an accelerometer as is disclosed in U.S. Pat. No. 5,404,749 to Spangler, incorporated herein by reference. Also, see U.S. Pat. No. 5,264,075 to Zanini-Fisher et al., incorporated herein by reference, for an example of how one can seal such a device during its fabrication.

Figure 3:
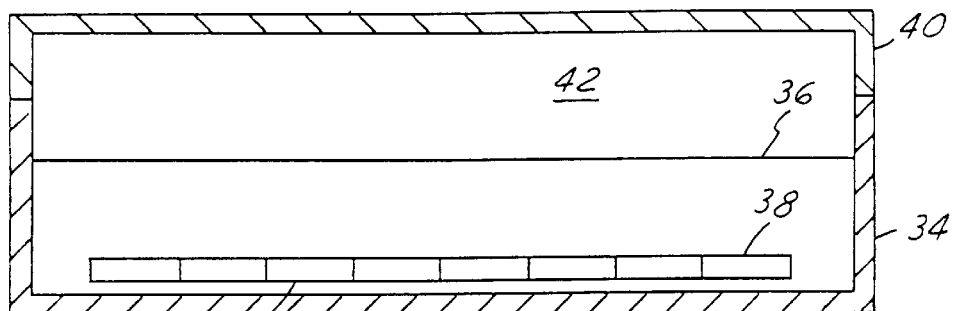
FIG. 3 is a schematic view of a wafer containing MEM devices undergoing a portion of the inspection process in accordance with the present invention.

It is important for certain applications to assure that the silicon lid 24 is sealed to the glass substrate 22. The method disclosed herein provides such assurance. FIG. 3 illustrates the first steps in the hermeticity inspection. A container 34 is filled partially with liquid 36. This can be any of various liquids, such as fluorescent dies, but preferably is water in order to minimize cost. A wafer 38 of MEM devices 20 is placed in the water 36. Individual MEM devices 20 can be inspected, but it is more cost efficient to conduct these steps with the whole wafer 38. In fact, one may use a container with a deeper chamber and put more than one wafer in at a time in order to make the process more efficient.

The container 34 is then sealed with a lid 40, that is attached to the container 34 by a conventional method that will maintain a seal up to the desired pressure. After sealing, the space above the water 36 is pressurized. One method is to pump nitrogen 42 into the volume above the water 36 up to the desired pressure level. Another preferred method is to employ a hydraulic system to pressurize the water 36 itself with the container filled essentially completely with water 36. After pressurization, the wafer 36 then remains in the pressurized container 34 for a predetermined amount of soaking time. This will allow for the water 36 to seep into any cavities that are not fully sealed. An added benefit of the high pressure water soaking is that it inherently cleans some of the contaminates off of the surfaces of the devices 20. So, while water is not the only liquid that can be employed for the high pressure soaking, it does possess this added advantage.

An example of the pressurized soaking portion of the process can be described with respect to the MEM device 20 of FIGS. 1 and 2. If the glass substrate 22 has overall length and width dimensions of about 0.070 inches and a thickness of about 0.023 inches, and the silicon lid 24 has length and width dimensions of about 0.065 inches and a thickness of about 0.016 inches, then a satisfactory test may include pressurizing the container 34 to about 1200 pounds per square inch and holding it there for about 24 hours. Of course, higher pressures may provide a more robust test, but then one must accommodate the higher pressures; and longer soak times may be preferred for allowing the water 36 to seep into the cavities, but then the test time is extended for each batch of devices. The length of time and pressures desired will also depend upon the size and shape of the device and cavity being tested for hermeticity.

After the pressurized soaking portion of the process, the wafer 38 is then removed from the container 34 and can be placed under a microscope 44 for observation by a technician. Preferably this is done with a precision X-Y table to assure accuracy in locating the wafer. If the devices 20 on the wafer 38 are observed by the technician in the air, then the observation must take place very soon after the wafer 38 is removed from the water 36 in order to avoid having the water evaporate from the cavities.

Figure 4:
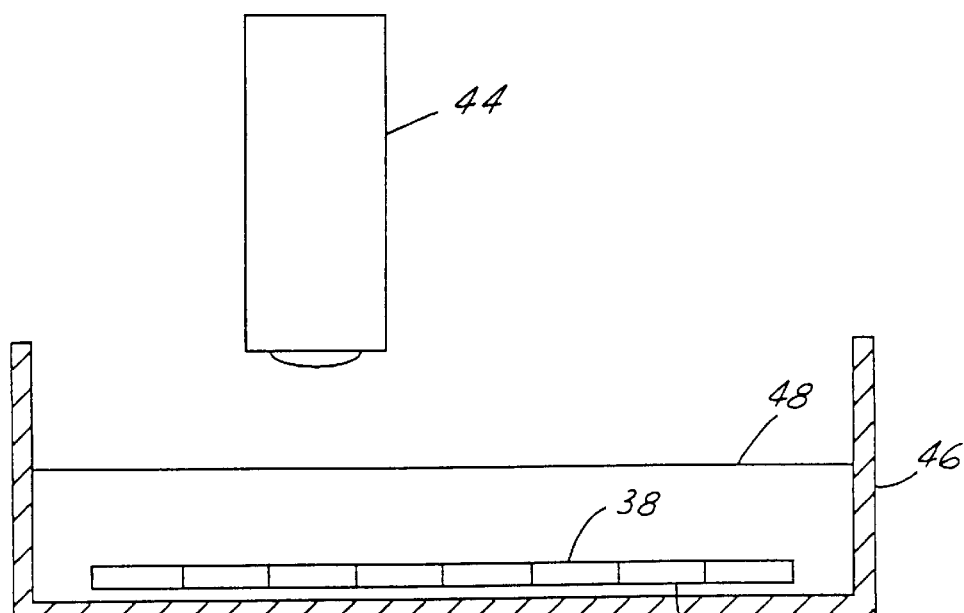
FIG. 4 is a schematic view of the wafer of the MEM devices undergoing another portion of the inspection process in accordance with the present invention.

A preferred way to conduct the inspection, in order to avoid the time constraint and assure more consistent results, is to transfer the wafer 38 from the container 34 and place it in a second container 46 of water 48 under the microscope 44, as is illustrated in FIG. 4. This avoids the concern with evaporation of the water that may have leaked into any of the cavities. A technician will then look through the microscope 44 at each cavity to determine if there are signs of water leakage into that particular cavity. There are several ways that the technician can then determine which devices are defective. One indicator is the shading of a particular cavity, with darker areas indicating the presence of water and relatively lighter areas indicating a gas, such as air. Other signs of possible water leakage are discussed below with respect to FIGS. 5–8.

As an alternative to moving the wafer 38 after the high pressure portion of the procedure, the high pressure container can be configured to allow for the wafer 38 to be left in the original water and inspected. But this then ties up the high pressure container until the visual inspection is done rather than allowing a new batch of wafers to begin the high pressure soak, and may require a more complicated design for the high pressure container, so it is preferred to move the wafer to another location.

FIGS. 5–8 illustrate various signs of water leakage within the cavities of MEM devices that are present after a high pressure soaking but before the water can evaporate. These figures show that it is relatively easy, through magnified visual inspection, to determine which cavities are not hermetically sealed and reject the devices as defective.

Figure 5:
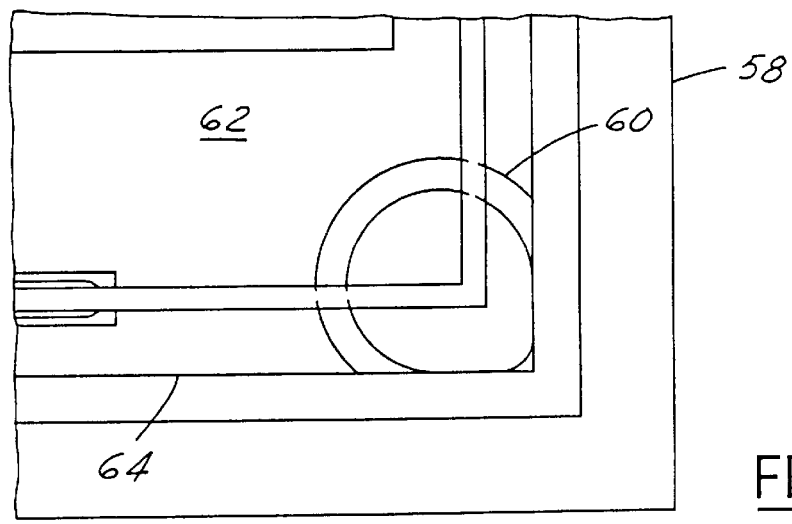
FIG. 5 is a view of a portion of a sample MEM device illustrating a gas bubble in the device.

FIG. 5 illustrates a portion of a sample MEM device 58 under the microscope after the high pressure water soaking. A gas bubble 60 is surrounded by water 62 under the lid 64, indicating that there was leakage. This device 58 does not have a proper hermetic seal and will be rejected as defective.

Figure 6:
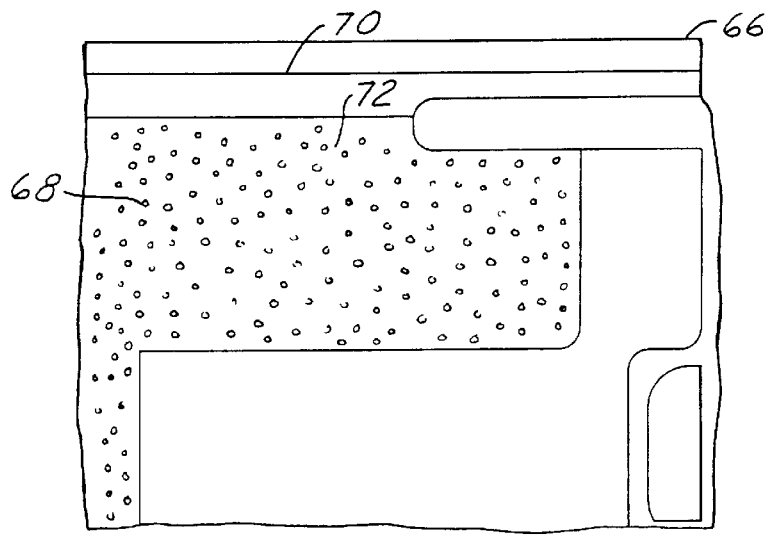
FIG. 6 is a view of a portion of another sample MEM device illustrating water droplets on a lid surface inside a cavity.

FIG. 6 illustrates a portion of another sample MEM device 66 under the microscope after the high pressure water soaking. One will note that water droplets 68 are adhering to a lid 70 inside a cavity 72, again indicating a defect.

Figure 7:
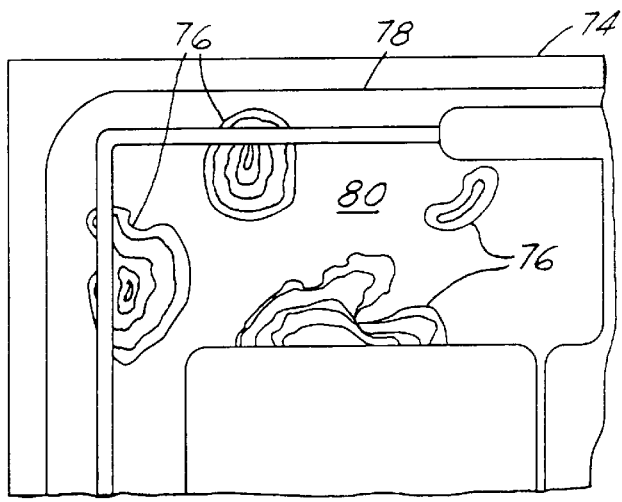
FIG. 7 is a view of a portion of yet another sample MEM device illustrating beads of water on a lid surface inside a cavity.
Figure 8:
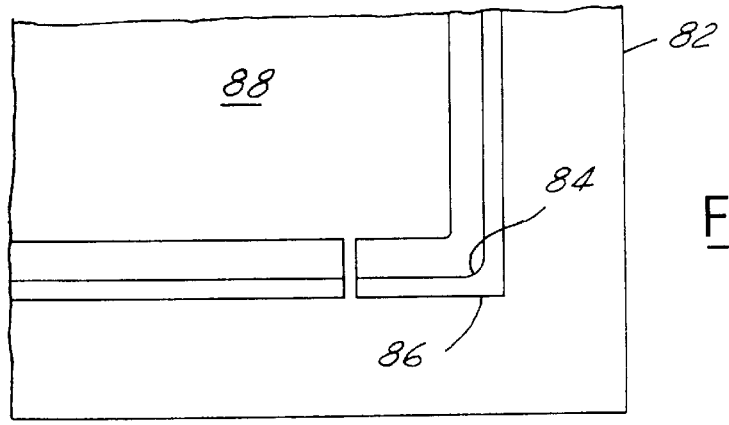
FIG. 8 is a view illustrating a portion of still another sample MEM device illustrating water in a corner of a cavity.

FIG. 7 is a view of a portion of yet another sample MEM device 74 illustrating beads of water 76 adhering to a lid surface 78 inside a cavity 80. And, FIG. 8 is a view illustrating a portion of still another sample MEM device 82 illustrating water 84 in a corner 86 of a cavity 88. Note that the corner 86 appears rounded, this indicates water 84 in the corner; a dry corner would have sharp edges. Again, FIGS. 7 and 8 indicate defective devices. While FIGS. 5–8 illustrate some signs of water in device cavities, they are not meant to be exhaustive since there are other indicators of water leakage, which sometimes depend upon the particular geometry of a given device, its features, and the shape and size of the cavity.

Thus, while certain embodiments of the present invention have been described in detail, those familiar with the art to which this invention relates will recognize various alternative designs and embodiments for practicing the invention as defined by the following claims.

We claim:

1. A method for inspecting for hermeticity of a device containing a cavity, the method comprising the steps of:
    submerging the device in a liquid;
    pressurizing the liquid to greater than one atmosphere for a given time period; and
    inspecting the device under magnification while submerged in the liquid for indications of the liquid in the cavity.

2. The method of claim 1 further including the steps of submerging the device in a second liquid prior to the step of inspecting the device.

3. The method of claim 1 wherein the liquid is water.

4. The method of claim 2 wherein the liquid is water and the second liquid is water.

5. The method of claim 1 wherein the step of pressurizing the liquid includes pumping nitrogen adjacent the liquid until a desired pressure is reached.

6. The method of claim 1 wherein the step of pressurizing the liquid includes creating hydraulic pressure on the liquid until a desired pressure is reached.

7. The method of claim 1 wherein the step of inspecting the device under magnification includes viewing the cavity with a microscope.

8. The method of claim 1 wherein the given time period, in the step of pressurizing the liquid, is greater than twenty hours.

9. The method of claim 1 wherein the pressure of greater than one atmosphere, in the step of pressurizing the liquid, is greater than 1000 pounds per square inch.

10. The method of claim 1 wherein the indication of liquid, in the step of inspecting the device, is a gas bubble surrounded by liquid within the cavity.

11. The method of claim 1 wherein the indication of liquid, in the step of inspecting the device, is liquid droplets adhering within the cavity.

12. The method of claim 1 wherein the indication of liquid, in the step of inspecting the device, is liquid beads adhering within the cavity.

13. The method of claim 1 wherein the indication of liquid, in the step of inspecting the device, is a rounded appearing corner in the cavity.

14. A method for inspecting for hermeticity of a device containing a cavity, the method comprising the steps of:
    filling a container with a liquid;
    submerging the device in the liquid;
    closeably sealing the container;
    pressurizing the liquid to greater than one atmosphere for a given time period; and
    inspecting the device under magnification while submerged in the liquid for indications of the liquid in the cavity.

15. The method of claim 14 further including the steps of removing the device from the liquid and submerging the device in a second liquid prior to the step of inspecting the device.

16. The method of claim 14 wherein the given time period, in the step of pressurizing the liquid, is greater than twenty hours, and the pressure of greater than one atmosphere, in the step of pressurizing the liquid, is greater than 1000 pounds per square inch.

17. The method of claim 14 wherein the liquid is water.

18. The method of claim 15 wherein the liquid is water and the second liquid is water.

19. A method for inspecting for hermeticity of a plurality of devices containing cavities, the method comprising the steps of:

filling a container with a liquid;

arranging the plurality of devices into an array;

submerging the array in the liquid;

closeably sealing the container;

pressurizing the liquid to greater than one atmosphere for a given time period; and inspecting the plurality of devices under magnification while submerged in the liquid for indications of the liquid in the cavity.

20. The method of claim 19 further including the steps of removing the plurality of devices from the liquid and submerging the plurality of devices in a second liquid prior to the step of inspecting the plurality of devices.

21. The method of claim 19 wherein said plurality of devices comprises a wafer of individual devices.

22. The method of claim 19 wherein said plurality of devices comprises a plurality of wafers of individual devices.

23. A method for inspecting for hermeticity of a device containing a cavity, the method comprising the steps of:

submerging the device in a first liquid;

pressurizing the liquid to greater than one atmosphere for a given time Period;

removing the device from the first liquid;

submerging the device in a second liquid; and inspecting the device under magnification while submerged in the second liquid for indications of the liquid in the cavity.

24. The method of claim 23 wherein the first liquid is water.

25. The method of claim 23 wherein the second liquid is water.

26. The method of claim 23 wherein the first liquid is water and the second liquid is water.

* * * * *